(12) United States Patent
Neuman et al.

(10) Patent No.: US 8,471,482 B2
(45) Date of Patent: ***Jun. 25, 2013

(54) INTELLIGENT DECORATIVE DISPLAYS WITH AMBIENT ELECTROMAGNETIC FIELD SWITCHING

(75) Inventors: Robert C. Neuman, Cannon Falls, MN (US); Michael B. Lasky, Atlanta, GA (US)

(73) Assignee: Seasonal Specialties, LLC, Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/176,269

(22) Filed: Jul. 5, 2011

(65) Prior Publication Data

US 2012/0001677 A1    Jan. 5, 2012

Related U.S. Application Data

(63) Continuation of application No. 12/135,327, filed on Jun. 9, 2008, now Pat. No. 7,973,486.

(51) Int. Cl.
*H01Q 1/26* (2006.01)
*F21S 4/00* (2006.01)

(52) U.S. Cl.
USPC .................................. 315/185 S; 315/34

(58) Field of Classification Search
USPC ............ 315/185 S, 185 R, 34, 312; 362/605, 362/565, 566, 567, 568
See application file for complete search history.

(56) References Cited

U.S. PATENT DOCUMENTS

| | | | |
|---|---|---|---|
| 5,034,658 A | 7/1991 | Hiering et al. | |
| 5,118,196 A * | 6/1992 | Ault et al. | 362/123 |
| 5,317,238 A | 5/1994 | Schaedel | |
| 5,852,348 A * | 12/1998 | Lin | 315/185 R |
| 5,880,676 A | 3/1999 | Tsou | |
| 7,276,911 B2 | 10/2007 | Frederick et al. | |
| 7,432,717 B2 * | 10/2008 | Frederick et al. | 324/414 |
| 7,973,486 B2 * | 7/2011 | Neuman et al. | 315/185 S |

* cited by examiner

*Primary Examiner* — Minh D A
(74) *Attorney, Agent, or Firm* — Altera Law Group, LLC

(57) ABSTRACT

A system and method of controlling self powered decorative devices using EMF emanating from, for example, a light string on a Christmas tree. The decorative devices sense the presence of EFM from the light string and actuate in response thereto and turn off when the field disappears, thereby saving energy. In an alternate embodiment, the EMF source is capable of modulation and the slave decorations are coded and tuned to specific EMF characteristics, such as frequency. The master EMF source transmits the EMF of different characteristic thereby causing the coded slave decorations to operate in a synchronized matter. The system may also be responsive to music or other inputs to create special decorative effects.

15 Claims, 6 Drawing Sheets

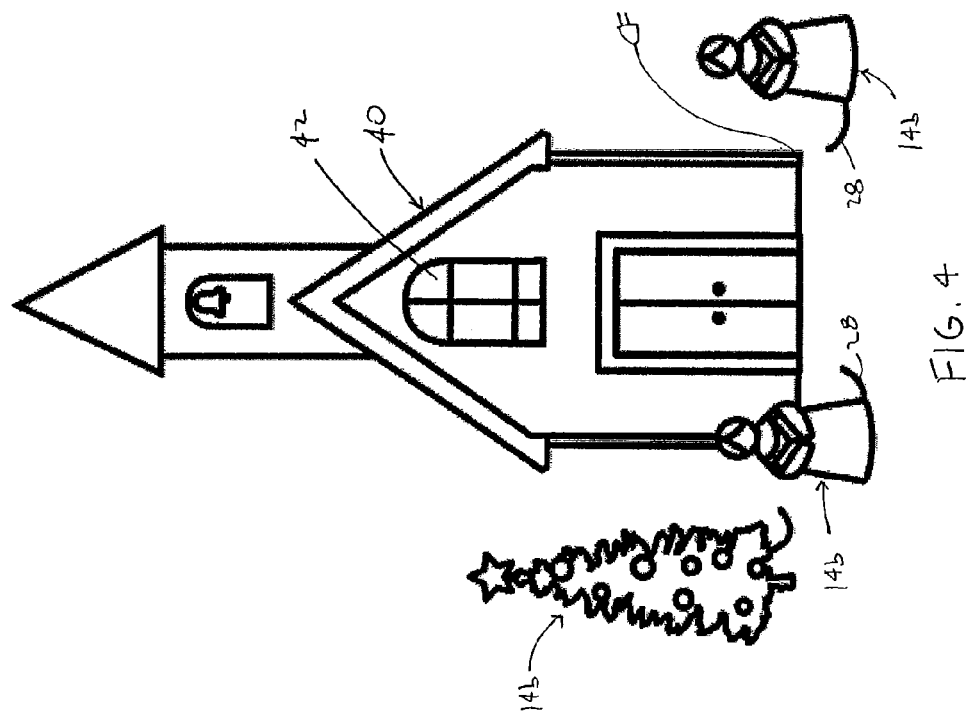
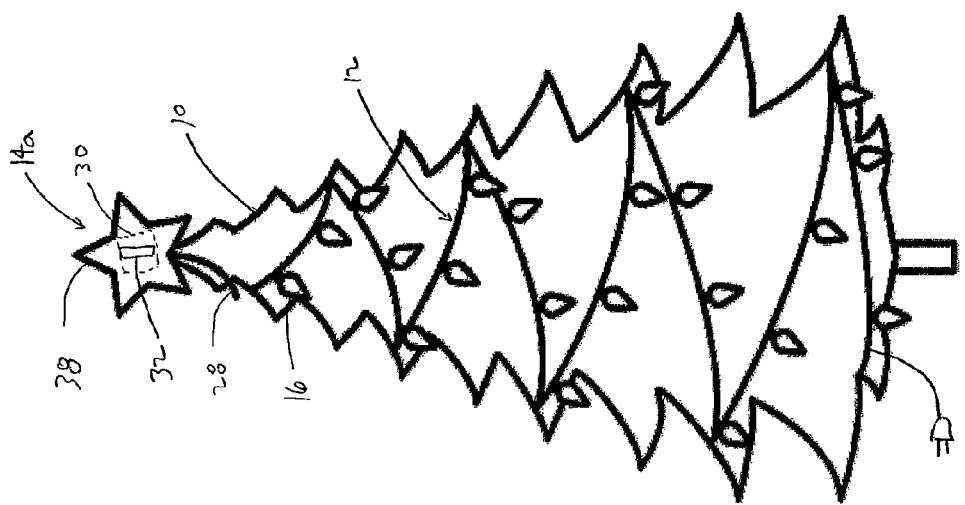

INTELLIGENT DECORATIVE DISPLAYS WITH AMBIENT ELECTROMAGNETIC FIELD SWITCHING

RELATED APPLICATION

The present application is a continuation of patent application Ser. No. 12/135,327 filed 9 Jun. 2008 which claims priority to U.S. Provisional Application No. 60/933,571 filed 7 Jun. 2007, which is incorporated by reference herein in its entirety.

TECHNICAL FIELD

The invention relates generally to decorative displays, and more particularly, to decorative displays incorporating ambient electromagnetic field switching and selectively responsive decorations.

BACKGROUND

Traditional decorative items displayed during holiday seasons include lights, ornaments, figurines, and other displays. Some decorative items of this type require a power source and electrical circuitry to provide illumination, motion, sound, and so on. For example, most decorative light strings adorning Christmas trees are powered by plugging the light string directly into an alternating current (AC) source provided by an adjacent light string, a switched outlet, or some other nearby AC power supply.

Alternatively, ornaments and some tree top lights placed on a Christmas tree may utilize a direct current (DC) power source such as a battery or other self contained/self powered system which does not require power from the AC/electrical network. The DC power source may be used to power a light source, rotate a motor shaft, play a recording, or perform some other function requiring electrical energy. For example, a tree top decoration placed at the pinnacle of a Christmas tree may be lit with a series of incandescent lights or light-emitting diodes (LEDs). Ornaments hung on a Christmas tree may spin in circles or move up and down, when power is switched on. Individual figures displayed on a table top may similarly move, "speak", or be lit using battery power. For such devices, the use of batteries as the source of DC power eliminates the need for bulky power cords, removes constraints on item location, and increases overall safety.

Despite the advantages of using DC power to power decorative displays, certain drawbacks exist. For example, when the number of battery-operated items displayed becomes large, manually switching each battery-operated device on and off becomes time-consuming and may disrupt the arrangement of the display. This becomes especially true when multiple battery-operated ornaments are displayed on a tree, or multiple figurines displayed on a table-top. Similarly, some decorative displays may not be within easy reach of the user, such as a lighted tree top display placed on the top of a tall tree, or an ornament placed at an inconvenient location on a tree. In addition to the inconvenience of having to manually switch display items on and off, items may become broken in the process due to repetitive handling, or may never be turned off, thereby wasting energy. With battery operated devices, energy conservation is a necessity. Thus is would be desirable to be able to turn on/off such devices remotely and to further intelligently control their actuation to create interesting effects.

Some prior inventions have attempted to address some aspects of these problems through the use of electromagnetic field (EMF) generation. Generally speaking, when an AC current flows through a conductor, an electromagnetic field is generated. The electromagnetic field comprises a magnetic and an electric field. An antenna 28 place near the source of the EMF will receive the EMF signal and a voltage and current generated at the antenna.

In one prior example, U.S. Pat. No. 5,118,196, issued to Ault et al., discloses a system that uses an AC-powered EMF generator to transmit oscillating radio-frequency EMF through a Christmas tree. In another example, U.S. Pat. No. 5,034,658 also employs a powerful EMF generator to provide oscillating power to light-emitting elements.

Such prior inventions directly power the targeted decorative items with the emitted oscillating EMF, which means that the power to the decorative item fluctuates with the frequency and amplitude of the EMF signal. Generally, this creates a flickering effect, which may not be desirable. Furthermore, a pinpoint source of EMF is prone to interference, with items further from the source operating less consistently. Other issues of concern include EMF exposure, space consumption, aesthetic appeal, and so on. As such, these types of systems have not been commercially popular.

At least one prior invention has tried to capture the use of ambient EMF generated by nearby AC powered devices to power a string of animated ornaments. U.S. Pat. No. 5,317,238, issued to Schaedel, discloses a series of ornaments wired together and powered by a DC source. The Schaedel invention uses EMF to light LEDs within the ornaments. The device in Schaedel relies on, and is limited to using CMOS counters to detect EMF and power LEDs in a rotating sequence to create an oscillating effect. Although this type of invention attempts to take advantage of ambient EMF generated by nearby devices, it still fails to address all of the problems previously discussed.

As such, there exists a need in the industry for decorative displays that can solve the problems described above.

BRIEF DESCRIPTION OF THE DRAWINGS

FIG. 3 is a diagram of one embodiment of the present invention illustrating a Christmas tree incorporating AC-powered light strings in the power-off state, and an EMF-switched lighted tree-top decoration.

FIG. 4 is a diagram of one embodiment of the present invention illustrating a table-top display incorporating an AC-powered light, and EMF-switched display pieces.

Figure 2:
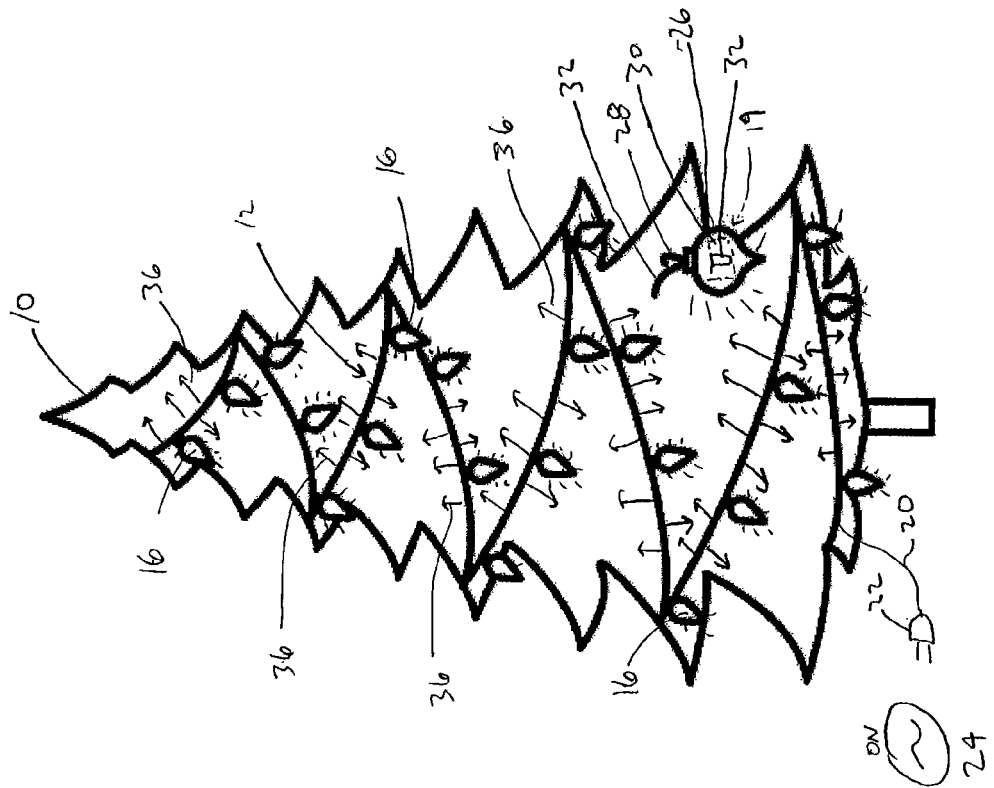
FIG. 2 is a diagram of one embodiment of the present invention illustrating a Christmas tree incorporating AC-powered light strings in the power-on state, and an EMF-switched ornament.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Figure 1:
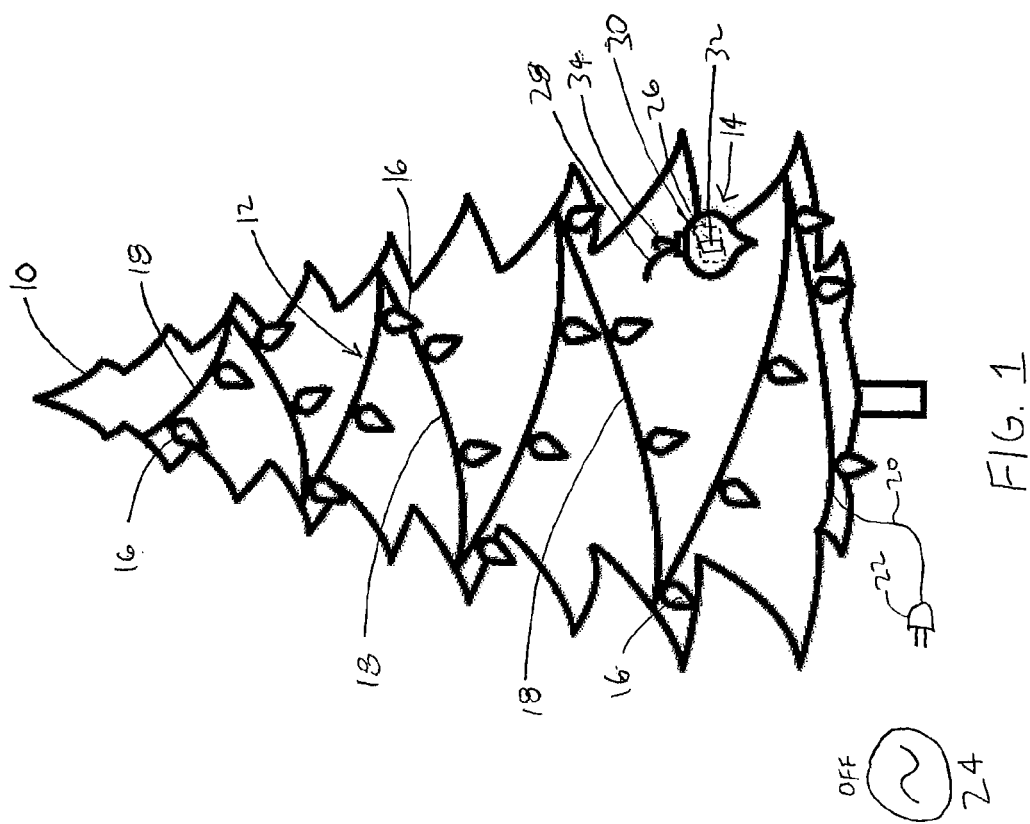
FIG. 1 is a diagram of one embodiment of the present invention illustrating a Christmas tree incorporating AC-powered light strings in the power-off state, and an EMF-switched ornament.

In the embodiment of the present invention depicted in FIG. 1, a Christmas tree 10 is decorated with one or more alternating current (AC) powered light strings 12 and one or more EMF-switched decorative displays 14. It is understood that the term "decorative displays" or "decorations" should be taken broadly to any remotely controllable element which may or may not be decorative. It can for example be purely functional and/or decorative. The term EMF switched is likewise to be taken as a broad term. Switched or actuated includes on/off/pulsation/twinkle/modulation and any other operating/actuation event Light string 12 includes light sources 16, intermediate conductors 18, power cord 20, and power plug 22. The term "light string" should also be taken broadly as a wire or other filament thru which electricity flows thereby creating EMF (and electromagnetic field) therearound. For example, any circuit, whether having illumination or now will provide EMF. Furthermore, there are other forms of EMF generators which are not long string filaments, including for example an antenna. Light string 12 is powered by AC power source 24, though in FIG. 1, the power to light string 12 is off. In one embodiment, AC power source 24 delivers 120V AC via a household power outlet, though power source 24 may be any suitable AC power source capable of delivering the power required by light strings 12.

EMF-switched decorative display 14 includes a housing 26, antenna 28, EMF-switching circuit 30, electrical display component 32, and optional hook 34.

Housing 26 may be made of plastic, metal, glass, ceramic, wood, or any other material suitable to decorative displays. As depicted in FIG. 1, housing 26 is in the shape of a bulb-shaped ornament, though housing 26 could take any number of decorative shapes and forms.

In one embodiment, antenna 28 is a length of conductive material, such as a metal wire, though in other embodiments, antenna 28 may be made of other materials capable of receiving an EMF signal.

Circuit 30 may be comprised of a number of circuit components adapted to receive an EMF signal and provide DC power to electrical display component 32. Circuit 30 is described in further detail below with reference to FIGS. 5-8.

Electric display component 32 in one embodiment may be an incandescent light source. In other embodiments, electric display component 32 may be a light-emitting diode, electric motor, sound chip, or other electrical component. Additionally, electrical display component 32 may be a combination of two or more such electrical components.

Optional hook 34 in one embodiment may resemble a curved metallic or plastic hook intended to secure EMF-switched decorative display 14 to tree 10. In some embodiments, hook 34 is not included, and antenna 28 may be used to secure decorative display 14 to tree 10.

Referring now to FIG. 2, when AC power source 24 is connected to light strings 12 and switched on so as to deliver power, AC current flows through power plug 22, power cord 20, intermediate conductors 18, and light sources 16. As depicted, this causes light sources 16 of light strings 12 to illuminate. At the same time, the movement of electrons generates an electromagnetic field (EMF). As the EMF varies with the AC current flow, an electric field is created. The EMF, including the electric field is depicted generally in FIG. 2 by arrows 36.

EMF-switched decorative display 26, located in the vicinity of light strings 12, detects the electromagnetic field generated by light strings 12 with antenna 28. Antenna 28 converts the received electromagnetic waves of the EMF, converting them to a voltage and current at circuit 30. Upon detecting the EMF and changing electric field through antenna 28, circuit 30 acts as a switch, allowing a DC power source to provide power to electrical display component 32. In one embodiment, when the EMF is removed, circuit 30 interrupts power to electrical display component 32.

Referring now to FIG. 3, in another embodiment, the EMF-switched decorative display is an EMF-switched lighted tree top 14a with a housing 38 in the shape of a star. Similar to the previously described decorative displays 14, EMF-switched lighted tree top 14a also includes an antenna 28, circuit 30, and electrical display component 32. In this embodiment, electrical display component 32 is a light source.

Referring now to FIG. 4, in yet another embodiment, the present invention includes a series of figurines 14b in the proximity of a central EMF-emitting source 40. In this embodiment, Central EMF-emitting source 40 is connected to an AC power source 24 which provides power to an electrical device 42 located within central EMF-emitting source 40. In one embodiment, electrical device 42 may be an incandescent bulb that illuminates central EMF-emitting source 40. For example, as depicted in FIG. 4, source 40 may be in the shape of a building such as a church, and electrical device 42 is an incandescent bulb that lights up the windows of the church.

The AC current flowing to electrical device 42 induces an EMF that is received at antenna 28 of figurines 14b, a circuit 30 allows a DC power source to power an electrical display component 32, in the manner as previously described.

Referring to FIGS. 1-4, any number of EMF-switched decorative displays 14 may be used together with a single EMF source. The distance that decorative displays 14 may be placed away from an EMF source varies with the amount of current flowing and the particular sensitivity of circuit 30. In one embodiment, a 100 mA light string 12 includes fifty light sources and is capable of switching multiple decorative displays 14 at distances of one foot or more.

Figure 5:
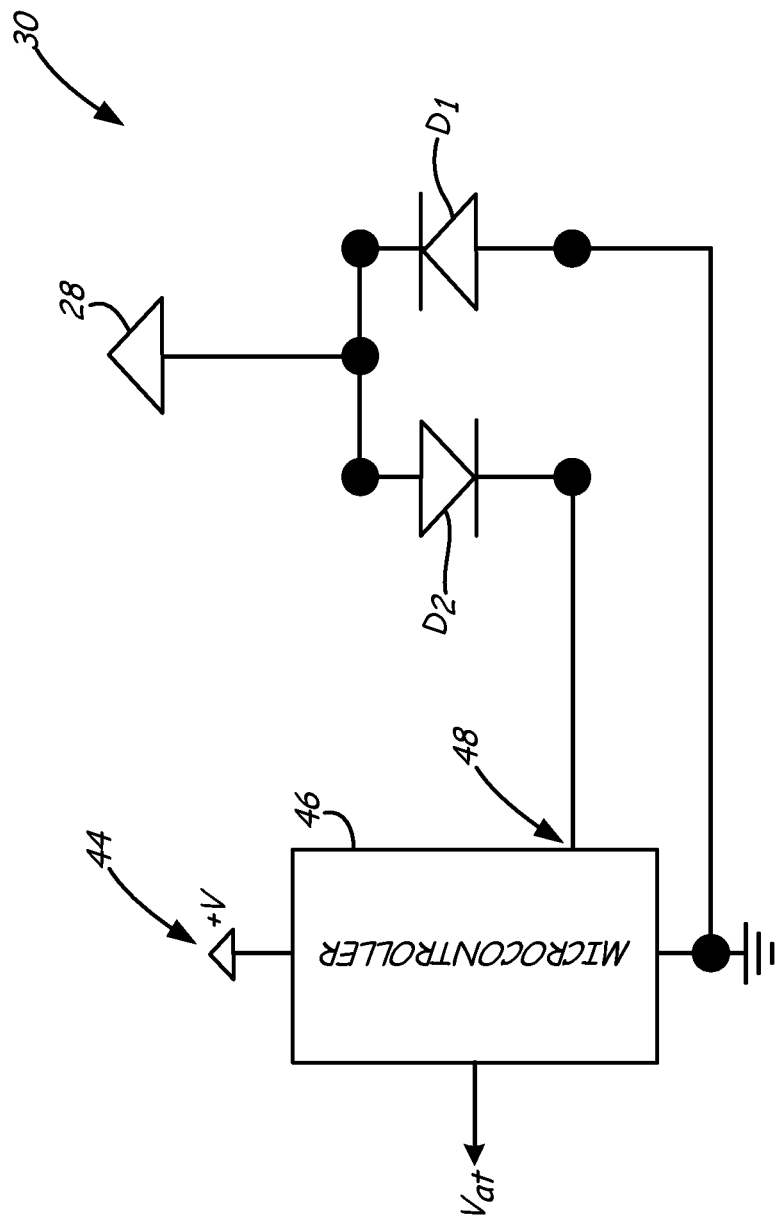
FIG. 5 is a sensing and switching circuit diagram of one embodiment of the present invention utilizing a microcontroller.

Referring now to FIG. 5, circuit 30 includes antenna 28, diodes 42, DC power supply 44, and microcontroller 46. In one embodiment, the anode side of diode D1 is electrically connected to ground, while the cathode end of D1 is electrically connected to the anode side of diode D2. One end of antenna 28 is electrically connected to the cathode end of diode D1 and the anode end of diode D2. As antenna 28 receives emitted EMF, an AC current is generated by the electric field present in the EMF, which is rectified by diodes D1 and D2. A resulting DC voltage is present at a sensing input 48 of microcontroller 46.

Microcontroller 46 is powered by DC source 44. In one embodiment, DC source 44 is a battery that provides a DC voltage appropriate for operating microcontroller 46. When the rectified voltage is received at sensing input 48 of microcontroller 46, in one embodiment, microcontroller 46 provides DC power at output Vout. In another embodiment, when microcontroller 46 receives the rectified voltage, microcontroller 46 executes its stored program, which may include providing DC power at output Vout. In turn, Vout provides power to electrical display component 32.

In one embodiment, when sensing input 48 stops receiving an input voltage, microcontroller 44, Vout is open, grounded, or negative. In another embodiment, when sensing input 48 stops receiving an input voltage, microcontroller 46 latches Vout to remain positive for a period of time. In some embodiments, microcontroller 46 controls power to the LEDs regardless of the presence or absence of EMF.

Figure 6:
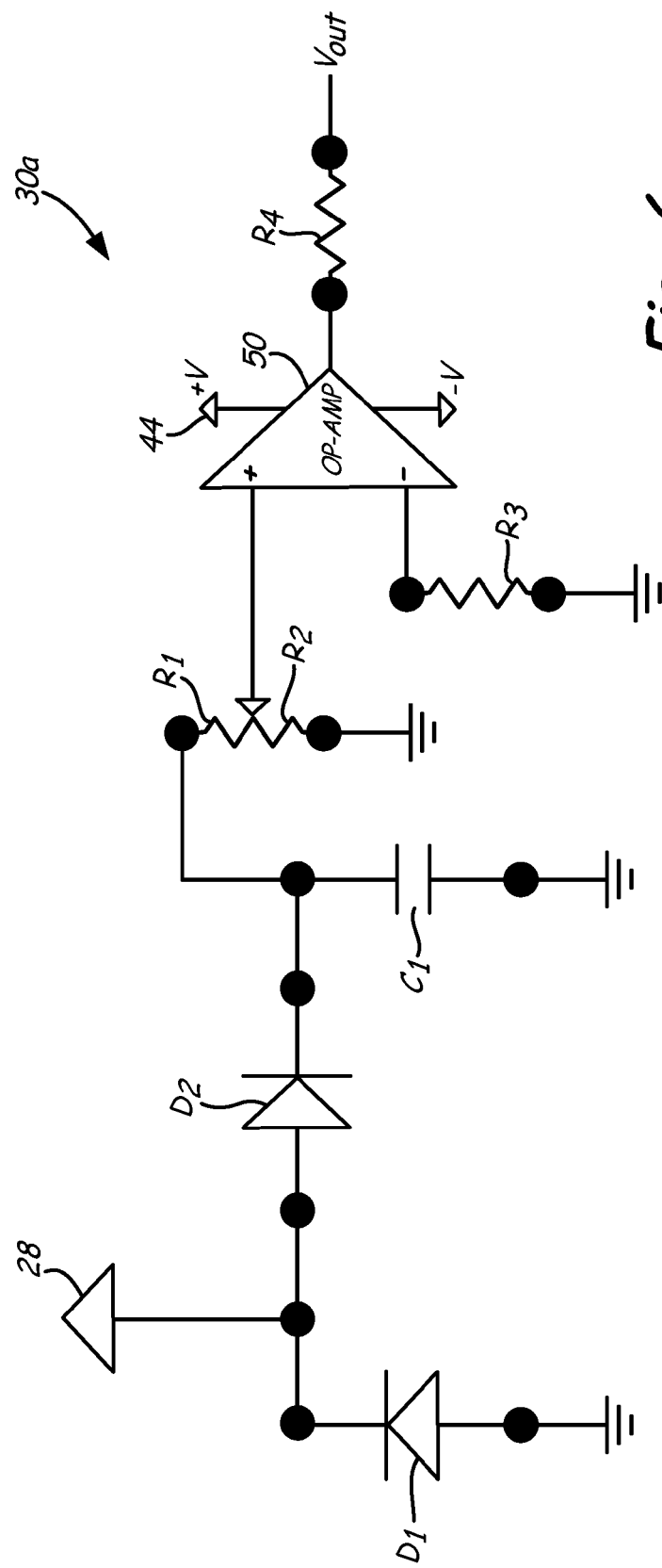
FIG. 6 is a sensing and switching circuit diagram of one embodiment of the present invention utilizing an operational amplifier.

In another embodiment, as depicted in FIG. 6, circuit 30a includes rectifying diodes D1 and D2, antenna 28, shunting capacitor C1, resistors R1 through R4, and operational amplifier ("op amp") 50. The anode side of diode D1 is electrically connected to ground, while the cathode end of D1 is electrically connected to the anode side of diode D2. A first end of antenna 28 is electrically connected to the cathode end of diode D1 and the anode end of diode D2. A first side of capacitor C1 is connected to the cathode end of diode D2 and a first end of R1. A second side of capacitor C1 is grounded. A second end of resistor R1 is connected to a first end of resistor R2 to form a series connection. The second end of resistor R1 and the first end of resistor R2 are also electrically connected to the positive input of op amp 50, thereby forming a voltage divider. The negative input to op amp 50 is connected to a first end of resistor R3, while the second end of R3 is grounded. Op amp 50 is provided with positive DC voltage from DC power source 44, while the reverse or negative DC voltage is supplied by DC power source 44 at the negative power input of op amp 50. The output of op amp 50 is connected to a first end of current limiting resistor R4. Vout is available at the second end of resistor R4.

In operation, when antenna 28 is not receiving an EMF signal, no voltage is sensed at the positive input to op amp 50, and the output of op amp 50 floats, or Vout is zero.

When antenna 28 receives emitted EMF, an AC current is generated by the electric field present in the EMF, which is rectified by diodes D1 and D2. Capacitor C1 and the combination of resistors R1 and R2 form an RC filter to remove unwanted noise. The values of R1 and R2 are selected to act as an appropriate voltage divider in order to reduce the generated voltage to one appropriate for the positive input of op amp 50. Adjusting the voltage divider effectively changes the sensitivity of the switching function of circuit 30a. Sensing this positive voltage that is greater than the negative input, the output of op amp 50 goes "high" and power is available at Vout via current limiting resistor R4.

Figure 7:
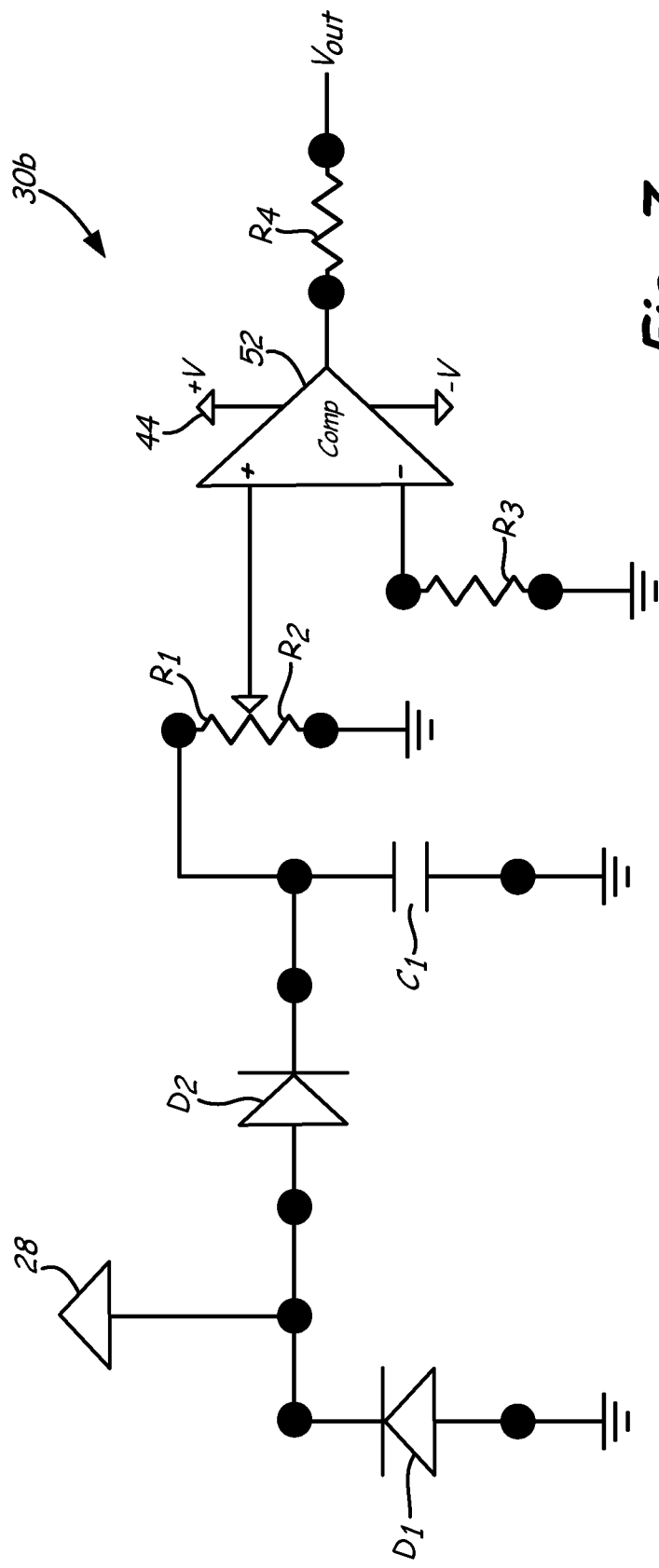
FIG. 7 is a sensing and switching circuit diagram of one embodiment of the present invention utilizing a voltage comparator.

Referring now to FIG. 7, the embodiment depicted as circuit 30b is nearly identical in composition and operation as compared to circuit 30 of FIG. 6, with the exception that op amp 50 is replaced with voltage comparator 52.

Figure 8:
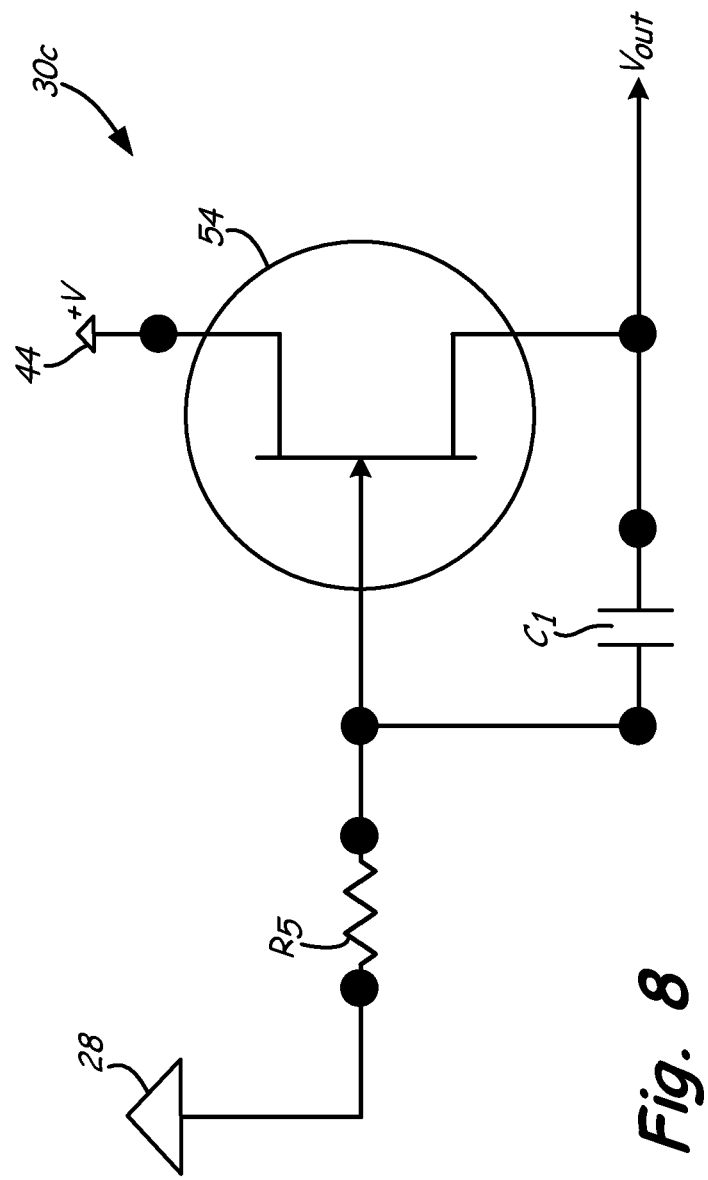
FIG. 8 is a sensing and switching circuit diagram of one embodiment of the present invention utilizing a field effect transistor.

Referring to FIG. 8, circuit 30c includes antenna 28, current limiting resistor R5, capacitor C2, and field-emitting transistor (FET) 54. This embodiment takes advantage of the sensitivity of FET devices, and when an EMF-induced voltage is applied to the gate of FET 54, Vout provides power to electrical display element 32.

In addition to on/off switching/actuation of decorations, it is possible to create an intelligent system for example of a light string 12 and a plurality of independently actuatable decorations which operate in predetermined patterns in response to or the lack of EMF in the tuned field of the EMF receiver which is preferably independently powered, such as by batteries.

An intelligent light string/decoration combination can be used to specifically address each decoration or groups of similarly coded decorations allowing the user to actuate according to a predetermined pattern, a decoration or groups thereof in a specific pattern or synchronization. The pattern could be as simple as on/off in response to the tuned EMF signal, or more sophisticated modes such as flash/twinkle/modulated etc in response to EMF. In response to a lack of EMF, the response could be simply off, but it could also be any other modulation including for example a "sleep" mode of flashes separated by long sleep (off) interval (for example off for periods equal to or greater than 1, 5, 10, 15, 30, 60, 120, 240 seconds) of quiescence, to save battery power. Diode lighting is very efficient and such sporadic flashes could be very interesting for a night environment where the light string is off and ambient light is minimal.

To accomplish this, the circuitry already disclosed may be used but modified as follows:

The first described circuitry merely senses EFM and turns the decoration on or off. The enhanced circuitry includes a tuned band pass filter such as that shown in FIG. 6 (using an RC circuit) to detect bands of EMF frequencies or other modulations. More sophisticated filters may be used and many are known in the art and available off the shelf which are active or passive band pass filters.

Each decoration 16 can be independently coded to be responsive to a specific allowed frequency range or more likely the system could have a range of coded products. For example letter codes A, B, C and D could designate specific frequency responsive filters within the decoration and the decoration could also include a switch to select the letter code of interest.

The light string 12, would further include frequency selectable EMF generator, that is, a modulated EMF signal of various selected frequencies can be generated and piggy backed on the light string 12. In effect, the string is used as an antenna to carry a simple modulation or coding of EMF signals to which the EMF coded decorations can respond in a predetermined way.

The light string would thus have an EMF generator which is preferably powered by the AC source and could be built into the plug 22 (such as in a well known transform plug combination box).

For example if a 120 hz (designated Code A) modulated EMF wave is issued by the generator and the decoration 16 having a tuned receiver or bandpass filter will detect the Code A signal and process it. The trigger/action which is taken by the decoration can varied, including on/off, twinkle, etc. If for example, all red light decorations are coded A, they will respond simultaneously to a Code A signal from the generator. This will result in synchronization of colors.

In addition to an EMF generator associated with the light string 12, one or more of the decorations themselves, or (non ornamental) device can function as a "master" controller where wherein the remaining decorations are responsive slaves. In such a system, the master device inserts an EMF modulated signal such as a pulse (width or frequency) on the carrier light string wire, which is then detected by the remaining slaves. The slave circuitry is modified to be responsive to particular EMF characteristic, such as frequency ranges, pulse width or other modulation. This can be accomplished by means know to a person skilled in the art, such as tuning the R-C network shown in FIG. 7 to be optimized to particular frequency ranges.

The master could be an enhanced slave with the additional EMF generating capability but a preferred solution would be to build the master into the light set 12 itself, so that there is an unlimited source of energy and the light string 12 provides an in-place transmitting antenna.

The EMF generator, preferably microprocessor controlled could be built into the AC plug or elsewhere, and produce a wide range of EMF frequencies/pulse width and other modulations, on top of the carrier voltage illuminating the bulbs. If the frequencies are high enough, the bulb illumination in the light strings will be unaffected by the EMF modulation or at least the human eye will not be able to detect these high frequency modulations over the 50 or 60 hertz carrier.

The result of this combination (EMF generator and slave decorations) the light string becomes an intelligent or smart controller of EMF responsive devices.

The EMF generator could likewise include a microprocessor responsive to software, such as on an SD memory card or other memory source which generated flashing patterns in the slaves in accordance with the user's desire, such as responsive to music, either contained on the chip with music or a sound detector capable of detecting ambient (background) sounds or music or other detector attached to the EMF generator.

An example of such a system would be as follows. The EMF generator is built into the AC plug 22 and has a microphone built therein as well as an SD card slot for reading data (typically music) and an output jack for connecting to an audio amplifier system or having an RF modulator for transmission to a nearby radio or other retransmission system. The generator is programmable to issue on/off/twinkle instructions of each of the slave decoration groups which are programmable coded A, B, C, D. Programming could be predetermined or field programmable, such as thru a PC.

The decorations also switchably coded A, B, C, D are responsive to modulation/fields generated by the generator and respond by turning the decoration on/off/twinkle etc. The user can create various pattern of light by coding the slave decorations as desired.

In the music mode, the generator can detect ambient music and flash the coded decorations in a predetermined pattern, for exampled by dividing the music spectrum into bands and assigning triggers ABCD to different bands. An alternative would be division by amplitude. The slave decorations would then respond musically.

The decorations could also respond to background talking and mimic the talking patterns by flashing/flickering/twinkling/glowing in response to the voice patterns and frequencies of the people talking with frequency responses assigned to the ABCD codes.

The SD memory card could likewise contain music which would be parsed by frequency, amplitude, etc, and transmitted in ABCD coding to the decorations for illumination response. The sound signal could be detected by the RF generator and then broadcast audibly over a nearby radio. Likewise, the generator could have alternative inputs for other signals, such as a radio, or contain a radio receiver contained therein.

The invention claimed is:

1. An intelligent control system for remotely controlling the switching of at plurality of slave decorations by a master source generator of EMF energy, comprising:
    a. a plurality of decorative powered elements,
    b. an EMF receiver associated with each element and receiving power therefrom,
    c. an antenna capable of receiving EMF energy;
    d. a tuned detector response to EMF energy of a predetermined characteristic; and
    e. a switch operated by said detector which operates the element in a predetermined pattern when EMF energy of said desired characteristic is detected by said receiver and operates the element in a second predetermined way when not present and
wherein said plurality of slave decorations each include a selection of switchable EMF frequency responsive filters allowing user to select which EMF frequency the decorative self-powered element will respond to and wherein a source generator includes a plurality of EMF transmission frequencies matched to selection of slave frequencies.

2. An intelligent control system for remotely controlling the switching of at plurality of slave decorations by a master source generator of EMF energy, comprising:
    a. a plurality of decorative powered elements,
    b. an EMF receiver associated with each element and receiving power therefrom,
    c. an antenna capable of receiving EMF energy;
    d. a tuned detector response to EMF energy of a predetermined characteristic; and
    e. a switch operated by said detector which operates the element in a predetermined pattern when EMF energy of said desired characteristic is detected by said receiver and operates the element in a second predetermined way when not present and
wherein said plurality of slave decorations each include a selection of switchable EMF frequency responsive filters allowing user to select which EMF modulations the decorative self-powered element will be response to and wherein a source generator includes a plurality of EMF transmission modulations matched to the selection of slave modulations.

3. A system of improved EMF responsive decorative lighting having a EMF source and a plurality of illuminated slave decorative elements having self contained power supplies, the improvement comprising:
    a. the EMF source including a capability of generating a plurality of coded EMF signals,
    b. the plurality of illuminated slave elements including a coded receiver capable of selectively receiving a plurality of EMF signals from the EMF source.

4. An intelligent control system for remotely controlling the switching of at plurality of slave decorations by a master source generator of EMF energy, comprising:
    a. a plurality of decorative elements,
    b. an EMF receiver associated with each decorative self powered element and receiving power therefrom,
    c. an antenna is capable of receiving EMF energy;
    d. a tuned detector responsive to EMF energy of a predetermined characteristic; and
    e. a switch operated by said tuned detector which operates the decorative self powered element in a predetermined pattern when EMF energy of said desired characteristic is detected by said receiver and operates the decorative self powered element and wherein said plurality of slave decorations, each includes a selection of switchable EMF frequency responsive filters allow an user to select which EMF frequency and wherein the master source generator of EMF energy generator includes a plurality of EMF transmission frequencies matched to the selection of slave frequencies.

5. An intelligent control system for remotely controlling the switching of at plurality of slave decorations by a master source generator of EMF energy, comprising
    a. a plurality of decorative self powered elements,
    b. an EMF receiver associated with each decorative self powered element and receiving power therefrom,
    c. an antenna is capable of receiving EMF energy;
    d. a tuned detector responsive to EMF energy of a predetermined characteristic; and
    e. a switch operated by said tuned detector which operates the decorative self powered element in a predetermined pattern when EMF energy of said desired characteristic is detected by said EMF receiver and operates the decorative self powered element in a second predetermined pattern when not present and, wherein said plurality of slave decorations, each includes a selectable modulation response capability according to EMF signals received to allow an user to select which EMF modulations and wherein the master source generator of EMF energy generator includes a plurality of EMF transmission modulations matched to the selection of slave modulations.

6. A system of improved EMF responsive decorative lighting having a source of EMF and a plurality of illuminated light decorative elements comprising:
   a. the EMF source including the capability of generating a plurality of coded EMF signals,
   b. the plurality of illuminated light decorative elements including a coded receiver capable of selectively receiving a plurality of EMF signals from the source of EMF.

7. The system of claim 4, wherein said EMF generator includes a microphone and is responsive to ambient sound and wherein said ambient sound patterns are transmitted to said slaves.

8. The system of claim 4, wherein said EMF generator includes a memory and EMF modulation is transmitted to the slaves in response to the contents of the memory.

9. The system of claim 4 wherein said slave elements including switchable tuning capable of receiving at least some of said coded EMF signals.

10. The system of claim 4 where said slaves sense the presence of EFM from the light string and actuate in response thereto and turn off when the EMF field disappears, thereby saving energy.

11. The system of claim 4 wherein said detector includes a rectifier circuit coupled to a bandpass filter.

12. The system of claim 4 wherein said detector includes a tuned R-C network.

13. The system of claim 5 wherein one of said predetermined patterns is a sleep mode, wherein said receiver is flash actuated periodically and then returns to an off mode.

14. The system of claim 5 wherein one of said predetermined patterns is a sleep mode, wherein said receiver is flash actuated periodically and then returns to an off mode.

15. The system of claim 6, wherein said plurality of illuminated light decorative elements including switchable and tuning capable of receiving at least some of said coded EMF signals.

* * * * *